UNITED STATES PATENT OFFICE.

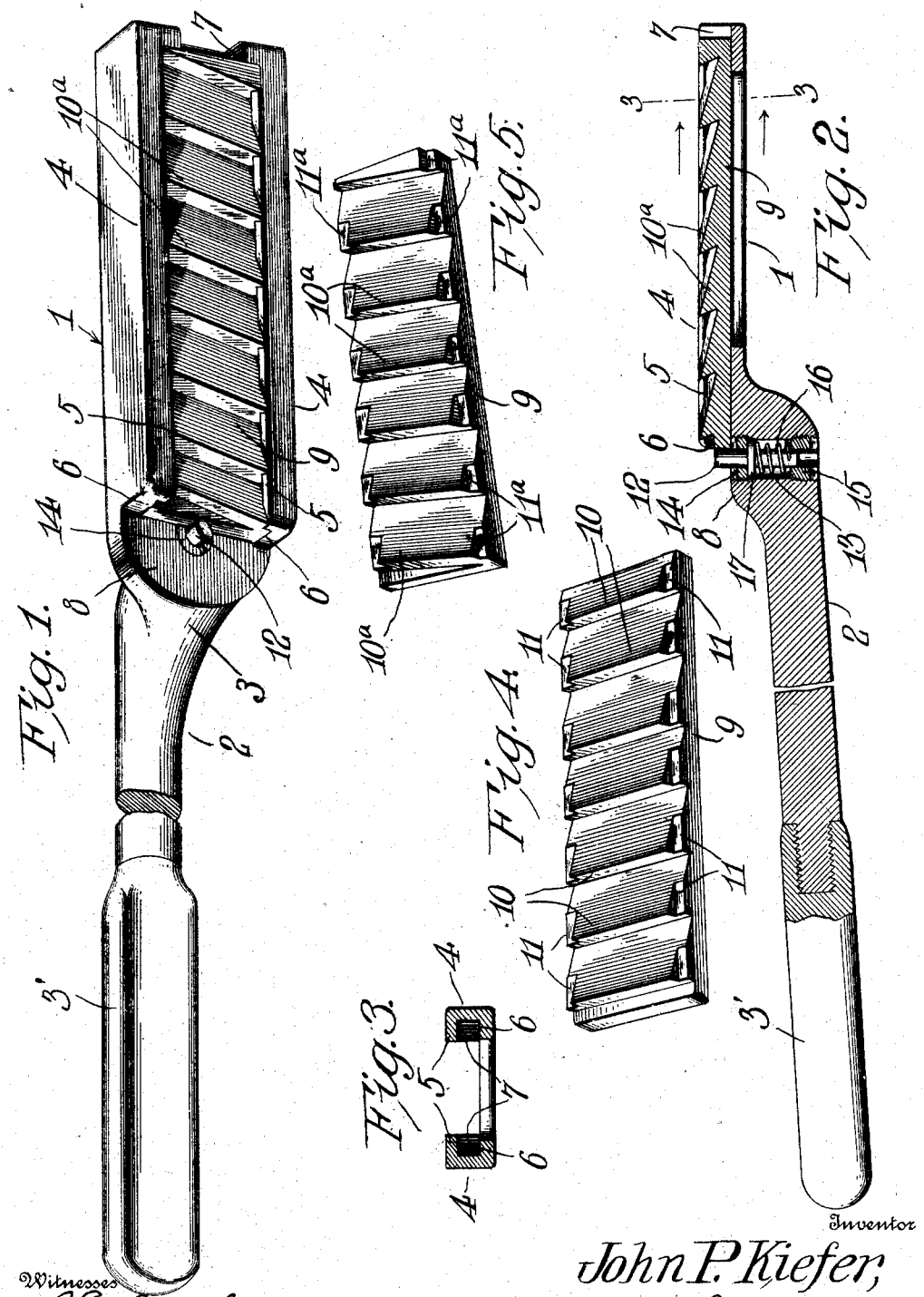

JOHN P. KIEFER, OF WASHINGTON, DISTRICT OF COLUMBIA.

VETERINARY DENTAL IMPLEMENT.

No. 927,249.

Specification of Letters Patent.

Patented July 6, 1909.

Application filed April 1, 1908. Serial No. 424,467.

*To all whom it may concern:*

Be it known that I, JOHN P. KIEFER, a citizen of the United States, residing at Washington, District of Columbia, have invented certain new and useful Improvements in Veterinary Dental Implements, of which the following is a specification.

This invention is a veterinary dental implement and is designed for cutting off the projecting edges of the molars when the latter have become worn.

Heretofore, it has been customary to file or rasp down the projecting edges. This is a very laborious and lengthy operation, requiring that the horse's mouth be propped open for a considerable length of time.

The prime object of the present invention is to provide for cutting off or severing the edges of the teeth as distinguished from filing, rasping or grinding them, and to enable the cutting operation to be performed by a single quick movement of the implement.

A further object of the invention is to provide for protecting the mouth of the horse against laceration by the cutting parts of the implement.

A still further object of the invention is to enable the convenient replacing of the cutting element when the latter becomes dull or damaged. In this connection it is proposed to provide an improved holder, and to enable the convenient application and removal of the tool with respect to the holder.

In the drawings,—Figure 1 is a perspective view of a veterinary implement embodying the features of the present invention. Fig. 2 is a longitudinal sectional view thereof. Fig. 3 is a cross sectional view on the line 3—3 of Fig. 2. Figs. 4 and 5 are detail perspective views of different forms of cutter blades.

Like characters of reference indicate corresponding parts in each of the several figures of the drawings.

The holder of the present invention includes the head 1, from which projects a shank 2 which lies wholly at the back of the head and is connected thereto by an integral offset 3. A suitable handle 3' is provided upon the outer end of the shank. That side of the head which is the underside in the operation of the implement, is provided with a longitudinal seat produced by a pair of longitudinal flanges 4, each of which has an inwardly-directed rib 5 overhanging the seat and defining a groove 6 which is open at its rear end and closed at its forward end by shoulders 7. As clearly shown in Fig. 1 of the drawings it will be noticed that the seat terminates short of the rear end of the head so as to provide a relatively broad or flat ledge or base 8.

Each cutting tool consists of a rectangular body 9 provided with a series of transverse cutting or severing teeth. In Fig. 4 the teeth 10 are disposed at substantially right angles to the longitudinal axis of the blade, with their long faces inclined longitudinally of the blade and their short faces disposed at substantially right angles to the plane of the blade. Each end of each tooth is cut away to form a flattened portion 11.

In Fig. 5 the teeth $10^a$ are inclined or oblique to the longitudinal axis of the plate, and each end of each tooth is cut away or reduced, as at $11^a$, as explained for the form shown in Fig. 4.

When one of the blades is to be assembled with the holder, it is slid endwise inwardly into the seat with its side edges or flanges produced by the cutaway portions $11^a$ received in the groove 6, the depth of the teeth being such that their cutting edges are slightly below or flush with the outer edges of the flanges 4.

Suitable means is provided for holding the blade in the seat, such for instance as a spring-pressed pin or plunger 12. This plunger is mounted in a bore or opening 13 formed transversely through the part 3 and of considerably greater diameter than the pin. Bushings 14 and 15 are threaded into the opposite ends of the opening, there being a suitable space between the bushings for the reception of a helical spring 16 which bears against the bushing 15 and against an annular flange 17 upon the pin, whereby one end of the latter is projected beyond the front of the head 1 in position to engage the rear end of the plate and thereby hold the latter against looseness.

In assembling the implement the forward end of the blade is placed against the projecting end of the pin so as to force the latter back far enough to permit of the blade being pushed forwardly into the seat, and when the rear end of the blade clears the plunger, the latter snaps out into its normal position and holds the plate in place. When it is desired to remove the blade, the plunger is retracted by pressing thereon with the thumb or finger and, thereafter, the blade is drawn rearwardly out of the seat.

It will be noted that the spring-pressed latch or plunger is entirely in rear of the seat in order that the blade may be placed against the outer end of the plunger to retract the same and at the same time to have the blade in position to be slid forwardly into the seat.

In practice, the horse's mouth is propped open in the usual manner, after which the implement is thrust into the mouth with the cutting teeth resting upon the teeth of the horse, and then the implement is pressed firmly against the teeth and quickly drawn out of the mouth, whereby the cutting teeth will sever the projecting ends of the horse's teeth in a very quick and satisfactory manner without in any manner damaging the teeth. After this one manipulation of the implement, the teeth may be filed down in the usual manner if it is found necessary.

As hereinbefore explained, the only portion of the cutting teeth which are exposed are those portions which lie between the flanges 4, and, therefore, the mouth of the animal is effectually protected against laceration because there are no projecting side edges on the blade, as they are entirely housed by the side walls of the seat.

What is claimed is:—

1. A veterinary dental implement comprising a shank provided at one end with a handle and at its opposite end with a blade having a series of cutting teeth, each tooth being disposed transversely of the shank with its cutting edge presented toward the handle and the direction of the series being longitudinal of the shank.

2. A blade for a veterinary dental implement consisting of a substantially oblong plate having a single series of cutting teeth with their cutting edges presented in the same direction, each tooth extending transversely of the blade, and the direction of the series of teeth being longitudinal of the blade.

3. A blade for veterinary dental implements consisting of a substantially rectangular plate provided with a series of cutting teeth, each tooth extending transversely of the blade, the direction of the series of teeth being longitudinal with respect to the plate, and the ends of the teeth being shouldered, substantially as and for the purpose set forth.

4. A blade for veterinary dental implements comprising a plate provided with a single series of cutting teeth with their edges extending in the same direction, each tooth extending transversely of the plate and having a length substantially twice its width, the direction of the series of teeth being longitudinal of the blade.

5. A veterinary dental implement comprising a shank provided at one end with a handle and at its opposite end with a seat which is open in one of its longitudinal faces, there being an internal longitudinal groove at each side of the open face portion of the seat, and a blade fitted in the seat with its opposite edges received within the respective grooves, said plate being provided with a single series of cutting teeth exposed through the open face of the seat, each tooth being disposed transversely of the blade with its cutting edge presented toward the handle.

In testimony whereof I affix my signature, in presence of two witnesses.

JOHN P. KIEFER.

Witnesses:
JNO. C. ATHEY,
JAMES L. KARRICK.